US012619254B2

(12) United States Patent
Cheng et al.

(10) Patent No.: US 12,619,254 B2
(45) Date of Patent: May 5, 2026

(54) UNMANNED PLATFORM WITH BIONIC VISUAL MULTI-SOURCE INFORMATION AND INTELLIGENT PERCEPTION

(71) Applicant: SOUTHEAST UNIVERSITY, Jiangsu (CN)

(72) Inventors: Xianghong Cheng, Jiangsu (CN); Fengyu Liu, Jiangsu (CN); Zhiwei Zhong, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 240 days.

(21) Appl. No.: 18/545,993

(22) Filed: Dec. 19, 2023

(65) Prior Publication Data

US 2024/0184309 A1 Jun. 6, 2024

Related U.S. Application Data

(63) Continuation of application No. PCT/CN2023/101257, filed on Jun. 20, 2023.

(30) Foreign Application Priority Data

Nov. 24, 2022 (CN) .......................... 202211481989.3

(51) Int. Cl.
G05D 1/622 (2024.01)
G01S 17/931 (2020.01)
(Continued)

(52) U.S. Cl.
CPC ............ G05D 1/622 (2024.01); G01S 17/931 (2020.01); *G05D 2101/15* (2024.01);
(Continued)

(58) Field of Classification Search
None
See application file for complete search history.

(56) References Cited

U.S. PATENT DOCUMENTS

2021/0333793 A1 10/2021 Gao et al.
2023/0135234 A1* 5/2023 Wang ................... G06V 10/774
382/103
2023/0251668 A1* 8/2023 Yamana .................... G06F 3/16
701/23

FOREIGN PATENT DOCUMENTS

CN 104713555 A * 6/2015 ............. G01C 21/20
CN 107553490 1/2018
(Continued)

OTHER PUBLICATIONS

CN-111652276-A English translation retrieved from Espacenet on Oct. 14, 2025 (Year: 2025).*

(Continued)

*Primary Examiner* — Amelia Vorce
(74) *Attorney, Agent, or Firm* — JCIPRNET

(57) ABSTRACT

Disclosed is an unmanned platform with bionic visual multi-source information and intelligent perception. The unmanned platform is equipped with a bionic polarization vision/inertia/laser radar combined navigation module, a deep learning object detection module and an autonomous obstacle avoidance module; the bionic polarization vision/ inertia/laser radar combined navigation module is configured to position and orient the unmanned platform in real time; the deep learning object detection module is configured to sense an environment around the unmanned platform according to RGB images of a surrounding environment collected by the bionic polarization vision/inertia/laser radar combined navigation module; and the autonomous obstacle avoidance module determines whether there are any obstacles around the unmanned platform during running according to the objects identified by the target, and performs autonomous obstacle avoidance in combination with the carrier navigation and positioning information. Concealment, autonomous navigation, object detection and autonomous obstacle avoidance capabilities of the unmanned platform are thus improved.

8 Claims, 4 Drawing Sheets

(51) Int. Cl.

| | |
|---|---|
| *G05D 101/15* | (2024.01) |
| *G05D 105/80* | (2024.01) |
| *G05D 111/10* | (2024.01) |
| *G05D 111/50* | (2024.01) |

(52) U.S. Cl.
CPC ...... *G05D 2105/87* (2024.01); *G05D 2111/10* (2024.01); *G05D 2111/52* (2024.01)

(56) References Cited

FOREIGN PATENT DOCUMENTS

| | | | | | |
|---|---|---|---|---|---|
| CN | 107643762 | | 1/2018 | | |
| CN | 108303081 | | 7/2018 | | |
| CN | 108981919 | A * | 12/2018 | ........... | G05D 1/0816 |
| CN | 109471433 | A * | 3/2019 | ........... | G05D 1/0223 |
| CN | 111045454 | A * | 4/2020 | ............. | G01C 21/20 |
| CN | 111238467 | | 6/2020 | | |
| CN | 111504312 | A * | 8/2020 | ............. | G01C 21/20 |
| CN | 111652276 | A * | 9/2020 | ............. | G06F 18/24 |
| CN | 113705375 | A * | 11/2021 | ............. | G06F 18/25 |
| CN | 114459474 | | 5/2022 | | |
| CN | 115574816 | | 1/2023 | | |

OTHER PUBLICATIONS

Long et al., "Transforming a 3-D LiDAR Point Cloud Into a 2-D Dense Depth Map Through a Parameter Self-Adaptive Framework", IEEE (Year: 2016).*

"International Search Report (Form PCT/ISA/210) of PCT/CN2023/101257", mailed on Jul. 21, 2023, pp. 1-4.

"Written Opinion of the International Searching Authority (Form PCT/ISA/237) of PCT/CN2023/101257", mailed on Jul. 21, 2023, pp. 1-4.

* cited by examiner

UNMANNED PLATFORM WITH BIONIC VISUAL MULTI-SOURCE INFORMATION AND INTELLIGENT PERCEPTION

CROSS-REFERENCE TO RELATED APPLICATION

This application is a continuation of international application of PCT application serial no. PCT/CN2023/101257 filed on Jun. 20, 2023, which claims the priority benefit of China application no. 202211481989.3 filed on Nov. 24, 2022. The entirety of each of the above mentioned patent applications is hereby incorporated by reference herein and made a part of this specification.

TECHNICAL FIELD

The present disclosure belongs to the technical field of computer vision and deep learning, and particularly relates to an unmanned platform with bionic visual multi-source information and intelligent perception.

BACKGROUND

Modern combat attaches great importance to intelligence and reconnaissance. In recent years, with the development of equipment technology, an unmanned platform having such functions as object detection, environmental perception, and autonomous navigation and positioning has been increasingly applied to military reconnaissance. Therefore, the positioning precision, operational autonomy and concealment of the unmanned platform have become key technologies in urgent need of development.

Being subject to such defects as error accumulation, and susceptibility to interference, inertial navigation, geomagnetic navigation and other traditional navigation methods are difficult to obtain the information about precise and stable course heading and position in complex environments. Therefore, other sensors are needed to be developed to assist in improving the positioning precision. By making reference to insects, polarization vision navigation is developed as a new bionic navigation method, which features error-free accumulation, being difficult to be interfered, neither emitting signals externally nor exposing the existence of a carrier itself. Moreover, by combing the polarization vision navigation with inertial in a field environment, the unmanned platform can achieve high-precision positioning and concealed operation. However, when the unmanned platform is in a closed environment, a polarized vision sensor loses lock, in which case, other sensors are needed to provide navigation and positioning information, and the navigation method of traditional single sensors is unable to meet the navigation and positioning requirements in the complex environment changing scenarios.

In addition, in order to realize efficient reconnaissance, it is necessary to improve the environment perception capability of the unmanned platform, to which object recognition technology is crucial. With continuous development of the deep learning technology, the tedious process of artificially designed features is avoided. Compared with the traditional object detection technology, the object detection technology based on deep learning has been proven to have higher precision and stronger robustness. With the development of the deep neural network, research in the field of object detection is basically divided into two directions, one is a two-stage object detection algorithm based on a region proposal, such as Faster-RCNN; and the other is a single-stage object detection algorithm based on regression calculation, such as YOLOv7. Although the two-stage object detection algorithm based on a region proposal has a high precision, its detection efficiency is not high. While the single-stage object detection algorithm, such as YOLOv7, proposed in 2022, surpasses all known object detectors in both velocity and accuracy in the range from 5 FPS to 160 FPS.

At present, no relevant research on unmanned platforms based on autonomous navigation, object detection and environment perception is available across China.

SUMMARY

Aiming at the problem of a lack of research on unmanned platforms based on autonomous navigation, object detection and environmental perception, the present disclosure provides an unmanned platform with bionic visual multi-source information and intelligent perception, the combined navigation technology based on the bionic polarization vision/inertia/laser radar, and the object detection and environment perception technology based on the deep learning are applied to the unmanned platform, such that, on the one hand, the problem that satellite navigation is susceptible to counter-reconnaissance and interference during wartime can be avoided, the concealment and autonomous navigation capabilities of the unmanned platform in complex environments (field environment and unknown enclosed environment) can be improved, and the stability and robustness of a combined navigation system are enhanced; on the other hand, a vision camera is used for intelligent perception aiming in the complex environments to improve the object detection and autonomous obstacle avoidance capabilities of the unmanned platform.

The above objective is implemented through the following technical solution:

an unmanned platform with bionic visual multi-source information and intelligent perception, including a bionic polarization vision/inertia/laser radar combined navigation module, a deep learning object detection module and an autonomous obstacle avoidance module;

the bionic polarization vision/inertia/laser radar combined navigation module is configured to position and orient the unmanned platform in real time;

the deep learning object detection module is configured to sense an environment around the unmanned platform according to RGB images of a surrounding environment collected by the bionic polarization vision/inertia/laser radar combined navigation module; and the autonomous obstacle avoidance module determines whether there are any obstacles around the unmanned platform during running according to the objects identified by the target, and performs autonomous obstacle avoidance in combination with the carrier navigation and positioning information obtained by the bionic polarization vision/inertia/laser radar combined navigation module.

The unmanned platform with bionic visual multi-source information and intelligent perception, where the bionic polarization vision/inertia/laser radar combined navigation module includes a bionic polarization camera, a laser radar sensor, an inertial sensor and a monocular vision camera sensor;

the bionic polarization camera is configured to sense an atmospheric polarization state, and solve course angle information;

the laser radar sensor is configured to obtain point cloud information of a surrounding environment and construct a dense map;

the inertial sensor is configured to update positions and orientations of the unmanned platform; and the monocular vision camera sensor is configured to perform object detection of the surrounding environment.

The unmanned platform with bionic visual multi-source information and intelligent perception, where the bionic polarization vision/inertia/laser radar combined navigation module contains two application scenarios: a field environment and an unknown enclosed environment;

where the bionic polarization camera and the inertial sensor are used in the field environment to improve the navigation and orientation precision of the unmanned platform; when the bionic polarization camera loses lock in an unknown enclosed environments, the laser radar sensor and the inertial sensor are used together to improve the navigation, positioning and mapping capabilities of the unmanned platform.

The unmanned platform with bionic visual multi-source information and intelligent perception, where working steps of the bionic polarization vision/inertia/laser radar combined navigation module is used in the field environment is as follows:

(101) using the bionic polarization camera to acquire a sky polarization pattern, and solving to obtain course angle information of the unmanned platform in a horizontal state; and using the inertial sensor to measure a roll angle, a pitch angle and a course angle of the unmanned platform, performing inclination angle compensation for the course angle in the horizontal state to obtain course angle information of the unmanned platform in a non-horizontal state; and (102) fusing the course angle information of the unmanned platform in the horizontal state and the course angle information of the unmanned platform in the non-horizontal state obtained in the step (101) by using the cubature Kalman filter algorithm assisted by a radial basis function neural network, and outputting the optimal course angle information.

The unmanned platform with bionic visual multi-source information and intelligent perception, where the step (101) has the following specific method:

since the course angle of the carrier in a geographic coordinate system in the horizontal state is $\varphi = \alpha_s - \alpha_b$, where $\alpha_b$ and $\alpha_s$ are azimuth angles of the solar meridian in a carrier coordinate system and the geographic coordinate system; under the condition that the local longitude and latitude information of the carrier and accurate time information at the time of observation are known, a solar elevation angle $h_s$ and a solar azimuth angle $\alpha_s$ in the geographic coordinate system are respectively as follows:

$$\sin(h_s) = \sin\delta\sin\beta + \cos\delta\cos\beta\cos t_s$$

$$\cos(\alpha_s) = \frac{\sin(h_s)\sin\beta - \sin\delta}{\cos(h_s)\cos\beta}$$

where $\delta$, $\beta$ and $t_s$ represent a declination angle of the sun, the latitude of an observation point and an hour angle of the sun respectively;

then, three-channel polarization images are collected through the bionic polarization camera carried by the unmanned platform, feature point sets are searched and identified based on all-sky-domain polarization data by using a feature that "an E-vector in a direction of the solar meridian is perpendicular to a scattering plane", the feature points are subjected to a linear fitting once to solve $\alpha_b$, and finally the course angle $\varphi$ of the carrier in the geographic coordinate system in the horizontal state can be solved;

when the unmanned platform is in the non-horizontal state, an E-vector direction will not be perpendicular to the solar meridian, but perpendicular to a solar vector, shown in the formula as below:

$$e_p^n \cdot a_{OS}^n = 0$$

where n represents a navigation coordinate system, b represents the carrier coordinate system, $$a_{OS}^n$$

represents a sun vector in the navigation coordinate system, and $$e_p^n$$

represents the E vector in the navigation coordinate system; the E-vector direction in the carrier coordinate system is defined as $$e_p^b = [\cos\alpha\sin\alpha 0]^T$$

where a represents a clockwise angle between a reference direction of the bionic polarization camera and an E-vector direction of incident light, and $$C_b^n$$

represents a direction cosine matrix from the carrier coordinate system to the navigation coordinate system, with $$e_p^n = C_b^n e_p^b$$

then in the navigation coordinate system, the sun vector $$a_{OS}^n$$

can be calculated by the solar azimuth angle $\alpha_s$ and the solar elevation angle $h_s$, as shown in the following formula:

$$a_{OS}^n = \begin{bmatrix} a_{OSx}^n \\ a_{OSy}^n \\ a_{OSz}^n \end{bmatrix} = \begin{bmatrix} \cos(h_s)\cos(\alpha_s) \\ \cos(h_s)\sin(\alpha_s) \\ \sin(h_s) \end{bmatrix}$$

where $$a_{OSx}^n, a_{OSy}^n, a_{OSz}^n$$

represent projection of the solar vector in the navigation system;

combined the above formula, the course angle $\Psi$ after inclination angle compensation in the non-horizontal state can be calculated: $\Psi = \arcsin c + \arctan d$, where c and d are intermediate parameters of the solution, and $$c = \frac{\cos\alpha\sin\theta - \sin\alpha\cos\theta\sin\phi}{c\tanh_s\sqrt{(\sin\alpha\sin\phi\sin\theta + \cos\alpha\cos\theta)^2 + \cos^2\phi\sin^2\alpha}}$$

$$d = \frac{\cos\alpha\cos\theta\cos\alpha_s + \sin\alpha\sin\phi\sin\theta\cos\alpha_s + \cos\phi\sin\alpha\sin\alpha_s}{\cos\alpha\cos\theta\sin\alpha_s + \sin\alpha\sin\phi\sin\theta\sin\alpha_s - \cos\phi\sin\alpha\cos\alpha_s}$$

in the formula, $\varphi$ and $\theta$ represent the roll angle and the pitch angle of the carrier in a non-horizontal state, which are obtained by the inertial sensor through solution.

The unmanned platform with bionic visual multi-source information and intelligent perception, where the step (102) has the following specific method:

first, the inertial sensor realizes initial alignment through the course angle information provided by the bionic polarization camera, the bionic polarization vision/inertial combination model is then established, the course angle information output by the inertial system is taken as the quantity of state, the course angle information obtained by the bionic polarization camera through the inclination angle compensation is used as the quantity measurement, and the cubature Kalman filter algorithm is adopted to conduct the data fusion;

a state model in a discrete form is expressed as:

$$x_k = f(x_{k-1}, u_{k-1}) + w_{k-1}$$

$$z_k = h(x_k) + v_k$$

where $x_k$ and $x_{k-1}$ represent the quantity of state at moments k and k−1 respectively; $u_{k-1}$ is a filter input; $z_k$ is the quantity measurement; f( ) and h( ) are a state transition equation and a measurement equation respectively; and $w_{k-1}$ and $v_k$ are uncorrelated zero-mean Gaussian process noise and measurement noise respectively;

a radial basis function neural network is introduced into a cubature Kalman filter framework to perform error compensation on a filter:

first, a window size h is set, which reflects that the cubature Kalman filter algorithm iteratively estimates the optimal course angle information for h moments within one window size, the quantity of state within a window, and innovations of the cubature Kalman filter and the optimal estimated course angle information are input to the radial basis function neural network for training; when data of the next moment come, the quantity of state, as well as gains and innovations of the cubature Kalman filter at that moment are input to the radial basis function neural network trained in the previous window, and the input and the output are as follows:

$$x_r = [\, K_r \;\; I_r \;\; p_r \;\; v_r \;\; q_r \;\; Z_r \,]^T$$

$$y_r = b_{bias} + \sum We^{-\frac{\|x_r - \mu\|^2}{2\sigma^2}} \quad r = 1, 2, \ldots, h$$

where r represents a certain moment when the $r^{th}$ data within the window come, $K_r$ and $I_r$ represent gains and innovations of the cubature Kalman filter within the window respectively, $p_r$, $v_r$ and $q_r$ represent the quantities of state of positions, velocities and attitudes of the inertial sensor within the window, $z_r$ represents the quantity measurement collected by the bionic polarization camera within the window, y, represents compensation output of the neural network, $b_{bias}$ represents bias matrix of network nodes, and W represents a weight matrix of the network nodes; and $$e^{-\frac{\|x_r - \mu\|^2}{2\sigma^2}}$$

represents a Gaussian kernel, where $\mu$ and $\sigma$ represent a center and a width of the Gaussian kernel function respectively, and $\|\cdot\|$ represents an Euclidean distance; and estimated values of the cubature Kalman filter algorithm at the current moment are then compensated and corrected through error values output by the radial basis function neural network, data of the next window size h, starting from the current correction moment, are used to continue training the radial basis function neural network. When data of the next moment after the end of a second window come, the estimated values of the cubature Kalman filter algorithm are compensated and corrected again through error values output by the retrained radial basis function neural network, and iteration is performed in such a way, so that the cubature Kalman filter can be optimized by the radial basis function neural network.

The unmanned platform with bionic visual multi-source information and intelligent perception, where the bionic polarization vision/inertia/laser radar combined navigation module is used in the unknown enclosed environment to improve the he navigation, positioning and mapping capabilities of the unmanned platform, including the following working steps:

(201) pre-integrating the inertial sensor, and performing discretization to obtain the relationship among positions, velocities and attitudes at the moment of two quantity measurement values of the inertial sensor by using a median method;

(202) designing a residual term through the pre-integration of the inertia sensor in the step (201) and calculating a Jacobian of the residual term relative to variables to be optimized to obtain pre-integration relative constraints, fusing the pre-integration relative constraints with relative pose constraints of the laser radar, constructing a nonlinear optimization model, constructing a laser/inertia odometry, and solving the optimal pose; and (203) mapping the unknown enclosed environments according to landmark points obtained by the laser/inertia odometry in the step (202).

The unmanned platform with bionic visual multi-source information and intelligent perception, where the step (201) has the following specific method:

in the step (201), performing navigation according to the measurement information of the inertial sensor and the laser radar when the unmanned platform enters the unknown closed environment and the bionic polarization camera suffers a failure; first, pre-integration is carried out on the inertial sensor, and a continuous expression of a pre-integration method is as follows:

$$p_{b_{k+1}}^w = p_{b_k}^w + v_{b_k}^w \Delta t + \iint_{t\in[k,k+1]} (q_{b_t}^w a_{b_t} - b_{a_t} - n_a - g^w) dt^2$$

$$v_{b_{k+1}}^w = v_{b_k}^w + \int_{t\in[k,k+1]} (q_{b_t}^w a_{b_t} - b_{a_t} - n_a - g^w) dt$$

$$q_{b_{k+1}}^w = q_{b_k}^w \otimes \int_{t\in[k,k+1]} \frac{1}{2} q_{b_t}^{b_k} \otimes (\omega_{b_t} - b_{\omega_t} - n_\omega) dt$$

where superscript b represents the carrier coordinate system, w is a world coordinate system, a time interval between two frames is $\Delta t$, $$p_{b_{k+1}}^w, p_{b_k}^w$$

represent positions at moments k+1 and k in the world coordinate system respectively, $$v_{b_{k+1}}^w, v_{b_k}^w$$

represent velocities at the moments k+1 and k in the world coordinate system respectively, $$q_{b_{k+1}}^w, q_{b_k}^w$$

represent attitudes at the moments k+1 and k in the world coordinate system respectively, $a_{b_t}$ and $\omega_{b_t}$ represent outputs of an accelerometer and a gyroscope at a moment t, $b_{a_t}$, $b_{\omega_t}$ represent zero bias of the accelerometer and the gyroscope at the moment t, $n_a$ and $n_\omega$ represent random noise of the accelerometer and the gyroscope, and $g^w$ represents a gravity acceleration in the world coordinate system.

The median method is adopted to perform discretization, and the relationship of outputs between the $i+1^{th}$ and the $i^{th}$ inertial sensors is as follows:

$$p_{b_{i+1}}^w = p_{b_i}^w + v_{b_i}^w \delta t + \frac{1}{2} \bar{a} \delta t^2$$

$$v_{b_{i+1}}^w = v_{b_i}^w + \bar{a} \delta t$$

8

-continued $$q_{b_{i+1}}^w = q_{b_i}^w \otimes \begin{bmatrix} 1 \\ \frac{1}{2}\bar{\omega}\delta t \end{bmatrix}$$

where $$p_{b_{i+1}}^w, p_{b_i}^w$$

represent positions at an output moment of the $i+1^{th}$ and the $i^{th}$ inertial sensors after discretization in the world coordinate system respectively, $$v_{b_{i+1}}^w, v_{b_i}^w$$

represent velocities at the output moment of the $i+1^{th}$ and the $i^{th}$ inertial sensors after discretization in the world coordinate system respectively, $$q_{b_{i+1}}^w, q_{b_i}^w$$

represent attitudes at the output moment of the $i+1^{th}$ and the $i^{th}$ inertial sensors after discretization in the world coordinate system respectively, and $\delta t$ represents an time interval of outputs between the $i+1^{th}$ and the $i^{th}$ inertial sensors; and acceleration $\bar{a}$ and angular velocity $\bar{\omega}$ are the average value of two quantity measurements, that is:

$$\bar{a} = \frac{1}{2} [q_{b_i}^w (a_{b_i} - b_{a_i} - n_a) - g^w + q_{b_{i+1}}^w (a_{b_{i+1}} - b_{a_{i+1}} - n_a) - g^w]$$

$$\bar{\omega} = \frac{1}{2} [(\omega_{b_i} - b_{\omega_i} - n_\omega) + (\omega_{b_{i+1}} - b_{\omega_{i+1}} - n_\omega)]$$

where $a_{b_i}$, $a_{b_{i+1}}$ represent outputs of the accelerometer at the output moment of the $i+1^{th}$ and the $i^{th}$ inertial sensors respectively, $\omega_{b_i}$, $\omega_{b_{i+1}}$ represent outputs of the gyroscope at the output moment of the $i+1^{th}$ and the $i^{th}$ inertial sensors respectively, $b_{a_i}$, $b_{a_{i+1}}$ represent zero bias of the accelerometer at the output moment of the $i+1^{th}$ and the $i^{th}$ inertial sensors respectively, and $b_{\omega_i}$, $b_{\omega_{i+1}}$ represent zero bias of the gyroscope at the output moment of the $i+1^{th}$ and the $i^{th}$ inertial sensors respectively.

The unmanned platform with bionic visual multi-source information and intelligent perception, where the step (202) has the following specific method:

in the step (202), defining the quantity of state to be optimized and estimated of the system within a sliding window as:

$$X = [x_1^{imu}, \ldots, x_k^{imu}, \ldots, x_s^{imu}, x_1^{lidar}, \ldots, x_k^{lidar}, \ldots, x_s^{lidar}]^T$$

$$x_k^{imu} = [p_{b_k}^w, v_{b_k}^w, q_{b_k}^w, b_{a_k}, b_{\omega_k}]^T$$

$$x_k^{lidar} = [p_{l_k}^w, q_{l_k}^w]^T, k \in [0, s]$$

where the sliding window is provided with the quantities of state pre-integrated by the inertial sensor at s moments and the quantities of state obtained by the laser radar at s moments, the laser radar has a frequency of 10 Hz, the inertial sensor has a frequency of 200 Hz, and pre-integration is carried out between every two frames of the laser radar through the inertial sensor;

$$x_1^{imu}, x_k^{imu}, x_s^{imu}$$

represent pre-integrated states of the inertial sensor at an initial moment (a first moment), a moment k and a moment s respectively; and $$x_1^{lidar}, x_k^{lidar}, x_s^{lidar}$$

represent the quantities of state of the laser radar at the initial moment, the moment k and the moment s respectively; and $b_{a_k}$, $b_{\omega_k}$ are zero bias of the accelerometer and the gyroscope at the moment k, and $$p_{l_k}^w, q_{l_k}^w$$

are a position and an attitude estimated by the laser radar at the moment k;

After state variables are defined, the residual term of the inertia sensor and the laser radar is designed, the Jacobian of the residual term relative to variables to be optimized is calculated, and a nonlinear optimization function of the laser radar/inertial combined navigation is then constructed:

$$\min_X \left\{ \sum_{k=0}^{s} [r_B^k(z_{k-1}^k, x_k^{imu})]^2 + \sum_{k=0}^{s} [r_L^k(m_k, x_k^{lidar})]^2 \right\}$$

where $\lceil \ \rceil$ represents a Mahalanobis Distance of the vector, $$r_B^k$$

represents a measurement residual of the inertial sensor, $$r_L^k$$

( ) represents a point cloud measurement residual of the laser radar, $$z_k^{k+1}$$

represents relative measurement variation of the inertial sensor between the moments k and k−1, and $m_k$ represents measurement information of the laser radar at the moment k;

Finally, a Gauss-Newton method is adopted to solve the nonlinear optimization function, so as to obtain the optimal pose estimation.

The unmanned platform with bionic visual multi-source information and intelligent perception, where the deep learning object detection module has the following specific method:

first, the monocular vision camera sensor is used to collect RGB images of a surrounding environment, with the collection frequency of 30 Hz; a bilinear Interpolation algorithm is then adopted to adjust grayscale images to be a size of 640×640, and a median filtering algorithm is adopted to smoothly denoise the images and complete the pre-processing of the images; and a multi-directional blur superposition algorithm is adopted to simulate the blurred image problem caused by a vision camera in a real environment, as shown in the following formula:

$$P_{stack}^R = \sum_{j}^{m} T_j(P_j^R \cdot \gamma_j)$$

$$P_{stack}^G = \sum_{j}^{m} T_j(P_j^G \cdot \gamma_j) \quad j = 1, 2, 3, \dots, m$$

$$P_{stack}^B = \sum_{j}^{m} T_j(P_j^B \cdot \gamma_j)$$

where $$P_{stack}^R, P_{stack}^G, P_{stack}^B$$

represent pixel values of the corresponding coordinates after superposition on three RGB channel respectively, $$P_j^R, P_j^G, P_j^B$$

represent pixel values of the original coordinates on the three RGB channel respectively, $\gamma_j$ represents a transparency factor of the superposed images, and $T_j$ represents a blurring superposition displacement matrix, which is determined by a superposition direction, a step length and the number of superposed images; and an image data set simulated by the multi-directional blur superposition algorithm is input to a YOLOv7 deep learning network for training. Finally enhanced images are input to the trained YOLOv7 deep learning network to obtain object detection frames and vertex coordinates of various objects in the images.

DETAILED DESCRIPTIONS OF THE EMBODIMENTS

The technical solution of the present disclosure will be further described below in conjunction with the accompanying drawings.

Figure 1:
FIG. 1. is a hardware platform of an unmanned platform with bionic visual multi-source information and intelligent perception.

As shown in FIG. 1, the present disclosure provides an unmanned platform with bionic visual multi-source information and intelligent perception. The unmanned platform is equipped with a bionic polarization camera, a laser radar sensor, an inertial sensor and a monocular vision camera sensor.

The bionic polarization camera is configured to sense an atmospheric polarization state, and solve course angle information; the laser radar sensor is configured to obtain point cloud information of a surrounding environment and construct a dense map; the inertial sensor is configured to update positions and orientations of the unmanned platform; and the monocular vision camera sensor is configured to perform object detection of the surrounding environment.

Figure 2:
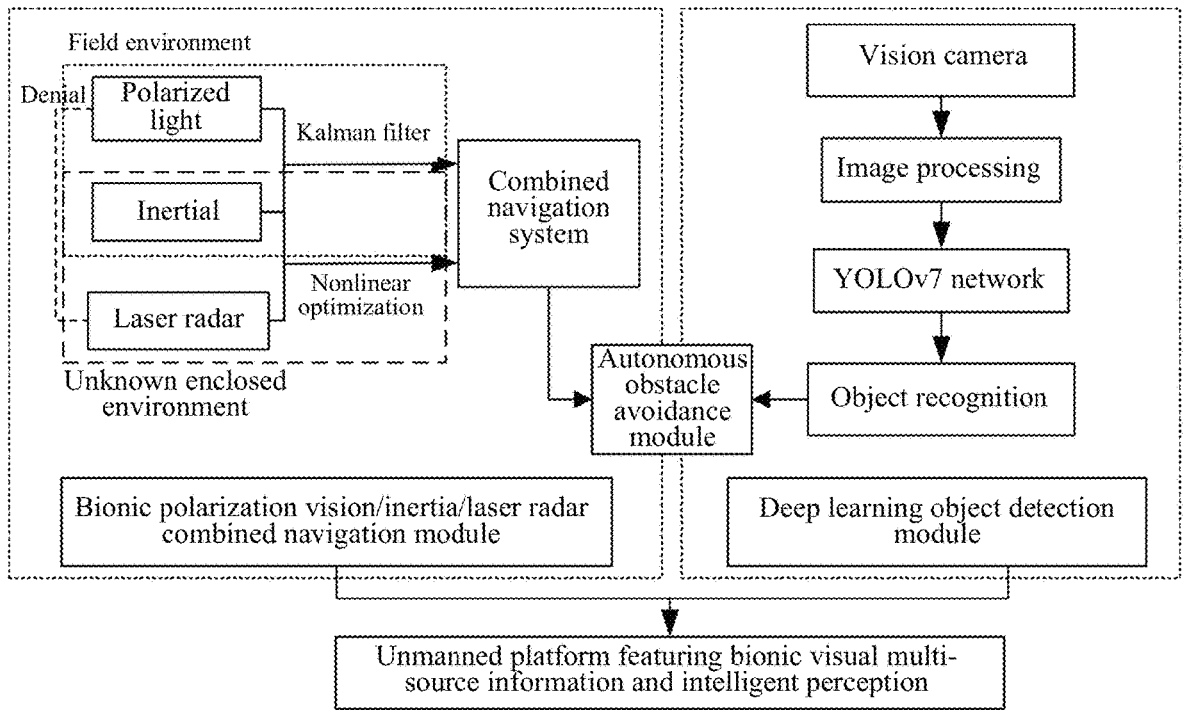
FIG. 2 is a schematic principle diagram of the present disclosure.

As shown in FIG. 2, the unmanned platform with bionic visual multi-source information and intelligent perception includes three major modules: a bionic polarization vision/inertia/laser radar combined navigation module, a deep learning object detection module and an autonomous obstacle avoidance module. The three major modules have different functions and are combined to realize the multi-source information and intelligent perception function of the unmanned platform.

The bionic polarization vision/inertia/laser radar combined navigation module is configured to position and orient the unmanned platform in real time, the deep learning object detection module is configured to sense an environment around the unmanned platform, and the autonomous obstacle avoidance module is configured to achieve autonomous obstacle avoidance of the unmanned platform by combining its own positioning information with a target object identified in the environment.

The bionic polarization vision/inertia/laser radar combined navigation module contains two application scenarios: a field environment and an unknown enclosed environment, where the bionic polarization camera and the inertial sensor are combined and used in the field environment to improve the navigation and orientation precision of the unmanned platform; when the bionic polarization camera loses lock in an unknown enclosed environments, the laser radar sensor and the inertial sensor are used together to improve the navigation, positioning and mapping capabilities of the unmanned platform.

Further, working steps of the bionic polarization vision/inertia/laser radar combined navigation module in the field environment are as follows:

(101) using the bionic polarization camera to acquire a sky polarization pattern, and solving to obtain course angle information of the unmanned platform in a horizontal state; and using the inertial sensor to measure a roll angle, a pitch angle and a course angle of the unmanned platform, performing inclination angle compensation for the course angle in the horizontal state to obtain course angle information of the unmanned platform in a non-horizontal state; and (102) fusing the course angle information obtained by the bionic polarization camera and the inertial sensor through the inclination angle compensation in the step (101) by using the cubature Kalman filter algorithm assisted by a radial basis function neural network, and outputting the optimal course angle information.

Figure 3:
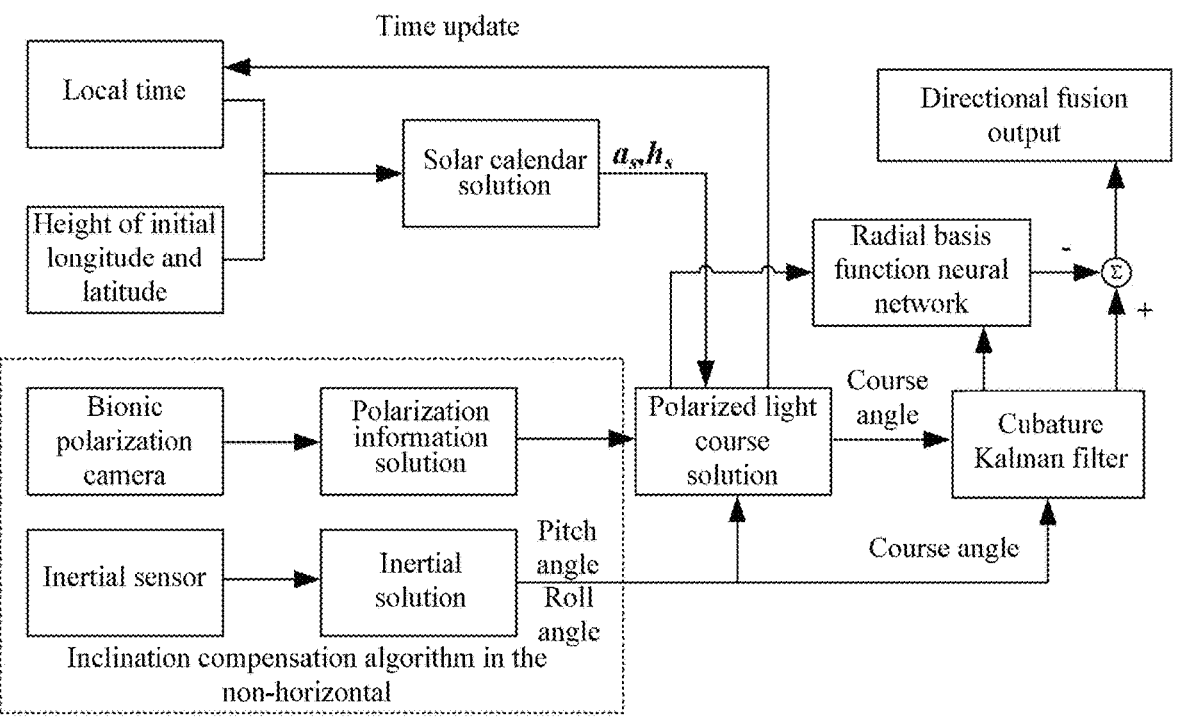
FIG. 3 is a bionic polarization vision/inertia combined navigation framework in a field environment.

An overall framework of the bionic polarization vision/inertial combined navigation module in the field environment is shown in FIG. 3, where the bionic polarization camera provides the course angle information by detecting polarization information of an atmospheric polarization pattern, and the inertial sensor realizes the initial course alignment through the bionic polarization camera. The bionic polarization camera is integrated with the inertial sensor, on the one hand, the inclination angle compensation is performed on the bionic polarization camera through the pitch angle and the roll angle provided by an inertial system to improve the solving precision of the course angle of the unmanned platform in the non-horizontal state; on the other hand, a bionic polarization vision/inertial combination model is established, the course angle information output by the inertial sensor is taken as a quantity of state, and the course angle solved by the bionic polarization camera is identified as quantity measurement, the cubature Kalman filter algorithm is adopted to conduct a fusion. In order to overcome the optimal estimation error generated by a filter, the cubature Kalman filter assisted by a radial basis function neural network is adopted to finally output the optimal course angle information.

Further, in the step (101), it can be concluded from a distribution pattern of the atmospheric polarization that a polarization pattern obtained therefrom varies with changes in a spatial position of the sun when a carrier's course changes. By solving azimuth information of the solar meridian in a carrier coordinate system, the course angle of the carrier in a geographic coordinate system is obtained, that is: $\varphi = \alpha_s - \alpha_b$, where $\alpha_b$ and $\alpha_s$ are azimuth angles of the solar meridian in the carrier coordinate system and the geographic coordinate system. Under the condition that the local longitude and latitude information of the carrier and accurate time information at the time of observation are known, a solar elevation angle $h_s$ and a solar azimuth angle $\alpha_g$ in the geographic coordinate system are respectively as follows:

$$\sin(h_s) = \sin\delta\sin\beta + \cos\delta\cos\beta\cos t_s$$

$$\cos(\alpha_s) = \frac{\sin(h_s)\sin\beta - \sin\delta}{\cos(h_s)\cos\beta}$$

where $\delta$, $\beta$ and $t_s$ represent a declination angle of the sun, the latitude of an observation point and an hour angle of the sun respectively.

Then, three-channel polarization images are collected through the bionic polarization camera carried by the unmanned platform, feature point sets are searched and identified based on all-sky-domain polarization data by using a feature that "an E-vector in a direction of the solar meridian is perpendicular to a scattering plane", and the feature points are subjected to a linear fitting once to solve $\alpha_b$. Finally, the course angle $\varphi$ of the carrier in the geographic coordinate system in the horizontal state can be solved.

When the unmanned platform is in the non-horizontal state, an E-vector direction will not be perpendicular to the solar meridian, but perpendicular to a solar vector, shown in the formula as below:

$$e_p^n \cdot a_{OS}^n = 0$$

where n represents a navigation coordinate system, b represents the carrier coordinate system, $$a_{OS}^n$$

represents a sun vector in the navigation coordinate system, and $$e_p^n$$

represents the E vector in the navigation coordinate system. The E-vector direction in the carrier coordinate system is defined as $$e_p^b = [\cos\alpha \; \sin\alpha \; 0]^T$$

where $\alpha$ represents a clockwise angle between a reference direction of the bionic polarization camera and an E-vector direction of incident light, and $$C_b^n$$

represents a direction cosine matrix from the carrier coordinate system to the navigation coordinate system, with $$e_p^n = C_b^n e_p^b$$

. Then in the navigation coordinate system, the sun vector $$a_{OS}^n$$

can be calculated by the solar azimuth angle $\alpha_s$ and the solar elevation angle $h_s$, as shown in the following formula:

$$a_{OS}^n = \begin{bmatrix} a_{OSx}^n \\ a_{OSy}^n \\ a_{OSz}^n \end{bmatrix} = \begin{bmatrix} \cos(h_s)\cos(\alpha_s) \\ \cos(h_s)\sin(\alpha_s) \\ \sin(h_s) \end{bmatrix}$$

where $$a_{OSx}^n, a_{OSy}^n, a_{OSz}^n$$

represent projection of the solar vector in the navigation system. Combined the above formula, the course angle $\Psi$ after inclination angle compensation in the non-horizontal state can be calculated: $\Psi = \arcsin c + \arctan d$, where c and d are intermediate parameters of the solution, and $$c = \frac{\cos\alpha\sin\theta - \sin\alpha\cos\theta\sin\phi}{c\tan h_s \sqrt{(\sin\alpha\sin\phi\sin\theta + \cos\alpha\cos\theta)^2 + \cos^2\phi\sin^2\alpha}}$$

$$d = \frac{\cos\alpha\cos\theta\cos\alpha_s + \sin\alpha\sin\phi\sin\theta\cos\alpha_s + \cos\phi\sin\alpha\sin\alpha_s}{\cos\alpha\cos\theta\sin\alpha_s + \sin\alpha\sin\phi\sin\theta\sin\alpha_s - \cos\phi\sin\alpha\cos\alpha_s}$$

in the formula, $\varphi$ and $\theta$ represent the roll angle and the pitch angle of the carrier in a non-horizontal state, which are obtained by the inertial sensor through solution.

Further, in the step (102), first, the inertial sensor realizes initial alignment through the course angle information provided by the bionic polarization camera, the bionic polarization vision/inertial combination model is then established, the course angle information output by the inertial system is taken as the quantity of state, the course angle information obtained by the bionic polarization camera through the inclination angle compensation is used as the quantity measurement, and the cubature Kalman filter algorithm is adopted to conduct the data fusion.

A state model in a discrete form is expressed as:

$$x_k = f(x_{k-1}, u_{k-1}) + w_{k-1}$$

$$z_k = h(x_k) + v_k$$

where $x_k$ and $x_{k-1}$ represent the quantity of state at moments k and k−1 respectively; $u_{k-1}$ is a filter input; $z_k$ is the quantity measurement; f( ) and h( ) are a state transition equation and a measurement equation respectively; and $w_{k-1}$ and $v_k$ are uncorrelated zero-mean Gaussian process noise and measurement noise respectively;

a radial basis function neural network is introduced into a cubature Kalman filter framework to perform error compensation on a filter: first, a window size h is set, which reflects that the cubature Kalman filter algorithm iteratively estimates the optimal course angle information for h moments within one window size, the quantity of state within a window, and innovations of the cubature Kalman filter and the optimal estimated course angle information are input to the radial basis function neural network for training. When data of the next moment come, the quantity of state, as well as gains and innovations of the cubature Kalman filter at that moment are input to the radial basis function neural network trained in the previous window, and the input and the output are as follows:

$$x_r = [\, K_r \quad I_r \quad p_r \quad v_r \quad q_r \quad z_r \,]^T$$

$$y_r = b_{bias} + \sum W e^{-\frac{\|x_r - \mu\|^2}{2\sigma^2}} \qquad r = 1, 2, \dots, h$$

where r represents a certain moment when the $r^{th}$ data within the window come, $K_r$ and $I_r$ represent gains and innovations of the cubature Kalman filter within the window respectively, $p_r$, $v_r$ and $q_r$ represent the quantities of state of positions, velocities and attitudes of the inertial sensor within the window, $z_r$ represents the quantity measurement collected by the bionic polarization camera within the window; $y_r$ represents compensation output of the neural network, $b_{bias}$ represents bias matrix of network nodes, W represents a weight matrix of the network nodes, and $$e^{-\frac{\|x_r - \mu\|^2}{2\sigma^2}}$$

represents a Gaussian kernel, where $\mu$ and $\sigma$ represent a center and a width of the Gaussian kernel function respectively, and $\|\cdot\|$ represents an Euclidean distance.

Estimated values of the cubature Kalman filter algorithm at the current moment are compensated and corrected through error values output by the radial basis function neural network. data of the next window size h, starting from the current correction moment, are used to continue training the radial basis function neural network. When data of the next moment after the end of a second window come, the estimated values of the cubature Kalman filter algorithm are compensated and corrected again through error values output by the retrained radial basis function neural network, and iteration is performed in such a way, so that the cubature Kalman filter can be optimized by the radial basis function neural network.

Further, working steps of the bionic polarization vision/inertia/laser radar combined navigation module in the unknown enclosed environment are as follows:

(201) pre-integrating the inertial sensor, and performing discretization to obtain the relationship among positions, velocities and attitudes at the moment of two quantity measurement values of the inertial sensor by using a median method;

(202) designing a residual term through the pre-integration of the inertia sensor in the step (201) and calculating a Jacobian of the residual term relative to variables to be optimized to obtain pre-integration relative constraints, fusing the pre-integration relative constraints with relative pose constraints of the laser radar, constructing a nonlinear optimization model, constructing a laser/inertia odometry, and solving the optimal pose; and (203) mapping the unknown enclosed environments according to landmark points obtained by the laser/inertia odometry in the step (202).

Further, in the step (201), performing navigation according to the measurement information of the inertial sensor and the laser radar when the unmanned platform enters the unknown closed environment and the bionic polarization camera suffers a failure. First, pre-integration is carried out on the inertial sensor, and a continuous expression of a pre-integration method is as follows:

$$p_{b_{k+1}}^w = P_{b_k}^w + v_{b_k}^w \Delta t + \iint_{t \in [k, k+1]} (q_{b_t}^w a_{b_t} - b_{a_t} - n_a - g^w) dt^2$$

$$v_{b_{k+1}}^w = v_{b_k}^w + \int_{t \in [k, k+1]} (q_{b_t}^w a_{b_t} - b_{a_t} - n_a - g^w) dt$$

$$q_{b_{k+1}}^w = q_{b_k}^w \otimes \int_{t \in [k, k+1]} \frac{1}{2} q_{b_t}^{b_k} \otimes (\omega_{b_t} - b_{\omega_t} - n_\omega) dt$$

where b represents the carrier coordinate system, w is a world coordinate system, and a time interval between two frames is $\Delta t$.

$$p_{b_{k+1}}^w, \, p_{b_k}^w$$

represent positions at moments k+1 and k in the world coordinate system respectively, $$v_{b_{k+1}}^w, \, v_{b_k}^w$$

represent velocities at the moments k+1 and k in the world coordinate system respectively, and $$q_{b_{k+1}}^w, \, q_{b_k}^w$$

represent attitudes at the moments k+1 and k in the world coordinate system respectively; $a_{b_t}$ and $\omega_{b_t}$ represent outputs of an accelerometer and a gyroscope at a moment t, $b_{a_t}$, $b_{\omega_t}$ represent zero bias of the accelerometer and the gyroscope at the moment t, $n_a$ and $n_\omega$ represent random noise of the accelerometer and the gyroscope, and $g^w$ represents a gravity acceleration in the world coordinate system.

The median method is adopted to perform discretization, and the relationship of outputs between the i+1$^{th}$ and the i$^{th}$ inertial sensors is as follows:

$$p_{b_{i+1}}^w = p_{b_i}^w + v_{b_i}^w \delta t + \frac{1}{2} \bar{a} \delta t^2$$

$$v_{b_{i+1}}^w = v_{b_i}^w + \bar{a} \delta t$$

$$q_{b_{i+1}}^w = q_{b_i}^w \otimes \begin{bmatrix} 1 \\ \frac{1}{2} \bar{\omega} \delta t \end{bmatrix}$$

where $$p_{b_{i+1}}^w, \, p_{b_i}^w$$

represent positions at an output moment of the i+1$^{th}$ and the i$^{th}$ inertial sensors after discretization in the world coordinate system respectively, $$v_{b_{i+1}}^w, v_{b_i}^w$$

represent velocities at the output moment of the i+1$^{th}$ and the i$^{th}$ inertial sensors after discretization in the world coordinate system respectively, $$q_{b_{i+1}}^w, q_{b_i}^w$$

represent attitudes at the output moment of the i+1$^{th}$ and the i$^{th}$ inertial sensors after discretization in the world coordinate system respectively, and $\delta t$ represents an time interval of outputs between the i+1$^{th}$ and the i$^{th}$ inertial sensors. Acceleration $\bar{a}$ and angular velocity $\bar{\omega}$ are the average value of two quantity measurements, that is:

$$\bar{a} = \frac{1}{2}\left[q_{b_i}^w\left(a_{b_i} - b_{a_i} - n_a\right) - g^w + q_{b_{i+1}}^w\left(a_{b_{i+1}} - b_{a_{i+1}} - n_a\right) - g^w\right]$$

$$\bar{\omega} = \frac{1}{2}\left[\left(\omega_{b_i} - b_{\omega_i} - n_\omega\right) + \left(\omega_{b_{i+1}} - b_{\omega_{i+1}} - n_\omega\right)\right]$$

where $a_{b_i}$, $a_{b_{i+1}}$ represent outputs of the accelerometer at the output moment of the i+1$^{th}$ and the i$^{th}$ inertial sensors respectively, $\omega_{b_i}$, $\omega_{b_{i+1}}$ represent outputs of the gyroscope at the output moment of the i+1$^{th}$ and the i$^{th}$ inertial sensors respectively, $b_{a_i}$, $b_{a_{i+1}}$ represent zero bias of the accelerometer at the output moment of the i+1$^{th}$ and the i$^{th}$ inertial sensors respectively, and $b_{\omega_i}$, $b_{\omega_{i+1}}$ represent zero bias of the gyroscope at the output moment of the i+1$^{th}$ and the i$^{th}$ inertial sensors respectively.

Figure 4:
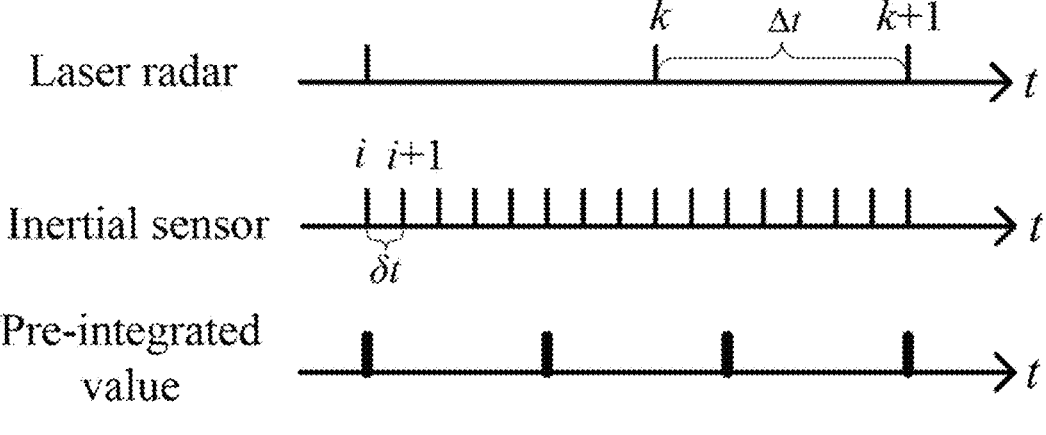
FIG. 4 shows a schematic diagram of the corresponding relationship between inertial sensor output/laser radar output and pre-integration.

Further, in the step (202), first defining the quantity of state to be optimized and estimated of the system within a sliding window as:

$$X = \left[x_1^{imu}, \dots, x_k^{imu}, \dots, x_s^{imu}, x_1^{lidar}, \dots, x_k^{lidar}, \dots, x_s^{lidar}\right]^T$$

$$x_k^{imu} = \left[p_{b_k}^w, v_{b_k}^w, q_{b_k}^w, b_{a_k}, b_{\omega_k}\right]^T$$

$$x_k^{lidar} = \left[p_{l_k}^w, q_{l_k}^w\right]^T, k \in [0, s]$$

where the sliding window is provided with the quantities of state pre-integrated by the inertial sensor at s moments and the quantities of state obtained by the laser radar at s moments, the laser radar has a frequency of 10 Hz, the inertial sensor has a frequency of 200 Hz, and pre-integration is carried out between every two frames of the laser radar through the inertial sensor.

$$x_1^{imu}, x_k^{imu}, x_s^{imu}$$

represent pre-integrated states of the inertial sensor at an initial moment (a first moment), a moment k and a moment s respectively; and $$x_1^{lidar}, x_k^{lidar}, x_s^{lidar}$$

represent the quantities of state of the laser radar at the initial moment (the first moment), the moment k and the moment s respectively. $b_{a_k}$, $b_{\omega_k}$ are zero bias of the accelerometer and the gyroscope at the moment k, $$p_{l_k}^w, q_{l_k}^w$$

are a position and an attitude estimated by the laser radar at the moment k, and the corresponding relationship between the inertial sensor output/laser radar output and the pre-integration is shown in FIG. 4.

After state variables are defined, the residual term of the inertia sensor and the laser radar is designed, the Jacobian of the residual term relative to variables to be optimized is calculated, and a nonlinear optimization function of the laser radar/inertial combined navigation is then constructed:

$$\min_X\left\{\sum_{k=0}^s\left[r_B^k\left(z_{k-1}^k, x_k^{imu}\right)\right]^2 + \sum_{k=0}^s\left[r_L^k\left(m_k, x_k^{lidar}\right)\right]^2\right\}$$

In the formula, $\lceil\ \rceil$ represents a Mahalanobis Distance of the vector, $$r_B^k$$

( ) represents a measurement residual of the inertial sensor, $$r_L^k$$

( ) represents a point cloud measurement residual of the laser radar, $$z_k^{k+1}$$

represents relative measurement variation of the inertial sensor between the moments k and k−1, and $m_k$ represents measurement information of the laser radar at the moment k.

Finally, a Gauss-Newton method is adopted to solve the nonlinear optimization function, so as to obtain the optimal pose estimation.

Figure 5:
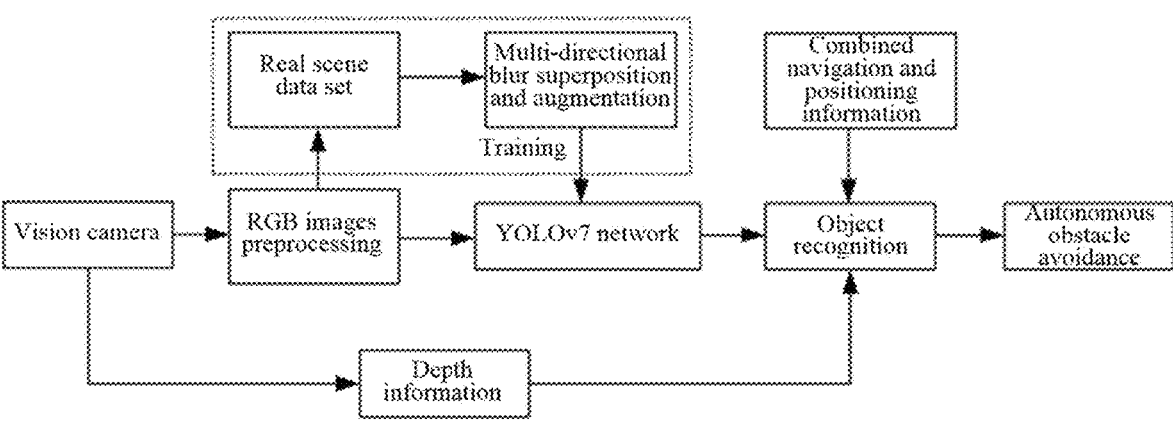
FIG. 5 is a flow chart of a deep learning object detection module.

Further, the unmanned platform with bionic visual multi-source information and intelligent perception, where the deep learning object detection module has the following specific method:

the whole process is shown in FIG. 5, first, the monocular vision camera sensor is used to collect RGB images of a surrounding environment, with the collection frequency of 30 Hz; a bilinear Interpolation algorithm is then adopted to adjust grayscale images to be a size of 640×640, and a median filtering algorithm is adopted to smoothly denoise the images and complete the pre-processing of the images.

A multi-directional blur superposition algorithm is adopted to simulate the blurred image problem caused by a vision camera in a real environment, as shown in the following formula:

$$P_{stack}^R = \sum_{j}^{m} T_j\left(P_j^R \cdot \gamma_j\right)$$

$$P_{stack}^G = \sum_{j}^{m} T_j\left(P_j^G \cdot \gamma_j\right) \quad j = 1, 2, 3, \ldots, m$$

$$P_{stack}^B = \sum_{j}^{m} T_j\left(P_j^B \cdot \gamma_j\right)$$

where $$P_{stack}^R, P_{stack}^G, P_{stack}^B$$

represent pixel values of the corresponding coordinates after superposition on three RGB channel respectively, $$P_j^R, P_j^G, P_j^B$$

represent pixel values of the original coordinates on the three RGB channel respectively, $\gamma_j$ represents a transparency factor of the superposed images, and $T_j$ represents a blurring superposition displacement matrix, which is determined by a superposition direction, a step length and the number of superposed images. An image data set simulated by the multi-directional blur superposition algorithm is input to a YOLOv7 deep learning network for training, and finally enhanced images are input to the trained YOLOv7 deep learning network to obtain object detection frames and vertex coordinates of various objects in the images.

The autonomous obstacle avoidance module determines whether there are any obstacles around the unmanned platform during running according to the objects identified by the target, and performs autonomous obstacle avoidance in combination with the carrier navigation and positioning information obtained by the bionic polarization vision/inertia/laser radar combined navigation module.

Simulation Experiment:

a hardware platform adopted by the unmanned platform with bionic visual multi-source information and intelligent perception is shown in FIG. 1. The carrier is an RIA-E100 unmanned vehicle, which is equipped with an Intel D435i vision camera, a VelodyneVLP-16 laser radar, an Ublox-RTK-GNSS, a SonyLucid polarization camera and a Pix-IMU inertial sensor.

Figure 6:
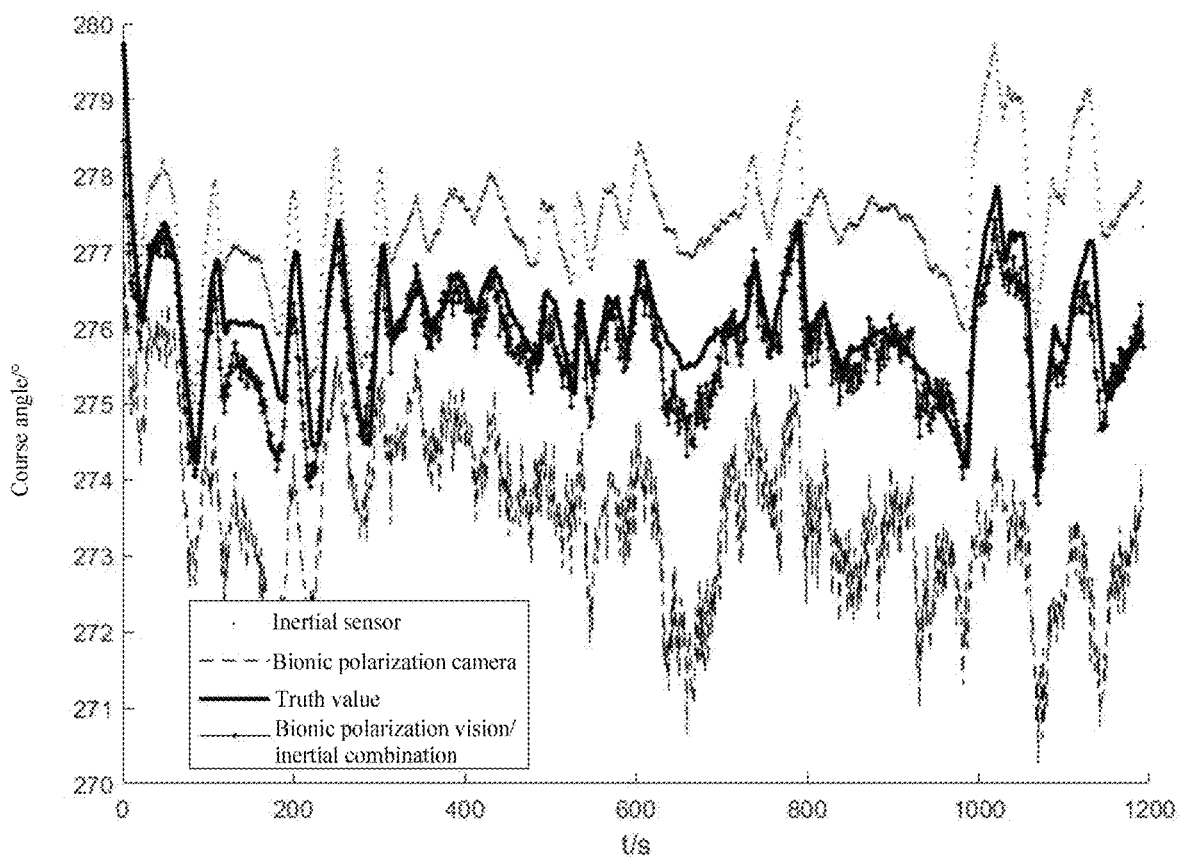
FIG. 6 shows a comparison chart of sports car experiments of a course angle solved by a bionic polarization camera, a course angle solved by an inertial sensor, a reference course angle of a high-precision navigation and positioning system, and a course angle fused and optimized by a cubature Kalman filter.

A bionic polarization vision/inertial combined navigation solution is verified in the field environment by an experiment, and a sports car experiment in 1,200 seconds is conducted outdoors, with the experimental results shown in FIG. 6. In the figure, the broken line consisting of dots represents the course angle information obtained through solution by the inertial sensor, the dotted line represents the course angle information obtained through solution by the bionic polarization camera, the heavy line represents the course angle reference information provided by a high-precision navigation and positioning system, and the star continuous line represents the optimal course angle information obtained through the bionic polarization vision/inertial combination. It can be seen from FIG. 6 that the bionic polarization vision/inertial combined navigation solution adopted by the present disclosure effectively improved the precision of the course angle. Table 1 itemizes a maximum error, a standard deviation, a root mean square error and a mean error of the bionic polarization camera, the inertial sensor and the cubature Kalman filter with the reference course angle, and quantitative comparison results verify the feasibility of the bionic polarization vision/inertial combined navigation solution in the field environment.

TABLE 1

| Comparison among Errors of the Bionic Polarization Vision/Inertial Combined Navigation | | | | |
| --- | --- | --- | --- | --- |
| | Maximum error | Standard deviation | Root mean square error | Mean error |
| Course angle of the bionic polarization camera | 5.50° | 0.86° | 2.65° | 2.51° |
| Course angle of the inertial sensor | 2.67° | 0.48° | 1.45° | 1.37° |
| Course angle through the bionic polarization vision/inertial combination | 1.60° | 0.39° | 0.48° | 0.37° |

The laser radar/inertial combined navigation solution is then verified in the unknown enclosed environment through experiments, and the situation of losing lock of the bionic polarization camera indoors is selected.

Figure 7:
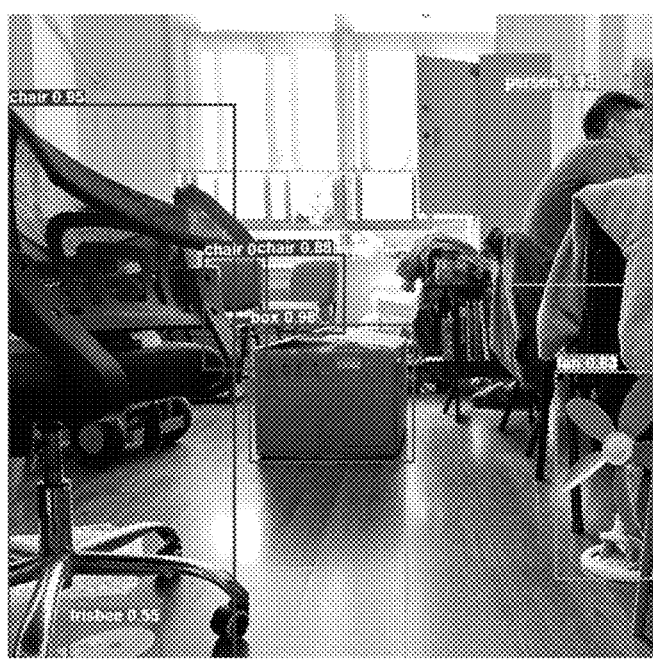
FIG. 7 shows results of object recognition performed by a deep learning object detection module during the traveling of an unmanned platform.
Figure 8:
FIG. 8 shows depth information of a surrounding environment during the traveling of an unmanned platform.

Finally, functions of the deep learning object detection module are verified through experiments, the experiments are carried out indoors, and the object recognition results are shown in FIG. 7. It can be seen from FIG. 7 that the surrounding environment is relatively complex, the object on the left closest to the car is a chair, and there is a box at the very front, and the obstacles are avoided by changing the path during the traveling according to the self-positioning information and the object detection frame information, as well as in combination with the depth information as shown in FIG. 8, such that the unmanned platform realizes autonomous obstacle avoidance.

The present disclosure has the following beneficial effects:

(1) the unmanned platform with bionic visual multi-source information and intelligent perception provided in the present disclosure can improve the comprehensive capabilities of the unmanned platform in the complex environments;

(2) the bionic polarization vision/inertia/laser radar combined navigation module provided in the present disclosure can avoid the problem that satellite navigation is susceptible to counter-reconnaissance and interference during wartime, improve the concealment and autonomous navigation capabilities of the unmanned platform in the complex environments (field environment and unknown enclosed environment), and enhance the stability and robustness of a combined navigation system; and (3) the deep learning object detection module provided in the present disclosure can improve the intelligent perception capability of the unmanned platform to the complex environments, and can improve the autonomous obstacle avoidance capability in combination with the combined navigation and positioning information.

As stated above, although the present disclosure has been illustrated and elaborated with reference to specific preferred embodiments, which cannot be construed as limitations on the present disclosure itself. Various variations can be made in form and detail in the present disclosure without departing from the spirit and scope of the present disclosure as defined by the appended claims.

What is claimed is:

1. An unmanned platform with bionic visual multi-source information and intelligent perception, comprising a bionic polarization vision/inertia/laser radar combined navigation module, a deep learning object detection module and an autonomous obstacle avoidance module, wherein the bionic polarization vision/inertia/laser radar combined navigation module contains two application scenarios: an outdoor environment and an unknown enclosed environment, wherein the bionic polarization vision/inertia/laser radar combined navigation module comprises a bionic polarization camera, a laser radar sensor, an inertial sensor and a monocular vision camera sensor, wherein the bionic polarization vision/inertia/laser radar combined navigation module is configured to position and orient the unmanned platform in real time;

the deep learning object detection module is configured to sense an environment around the unmanned platform according to RGB images of a surrounding environment collected by the bionic polarization vision/inertia/ laser radar combined navigation module;

the autonomous obstacle avoidance module determines whether there are any obstacles around the unmanned platform during running according to objects identified by a target, and performs autonomous obstacle avoidance in combination with carrier navigation and positioning information obtained by the bionic polarization vision/inertia/laser radar combined navigation module;

the bionic polarization camera is configured to sense an atmospheric polarization state, and solve course angle information;

the laser radar sensor is configured to obtain point cloud information of a surrounding environment and construct a dense map;

the inertial sensor is configured to update positions and orientations of the unmanned platform;

the monocular vision camera sensor is configured to perform object detection of the surrounding environment; and the bionic polarization camera and the inertial sensor are used in the outdoor environment for the navigation and orientation precision of the unmanned platform; when the bionic polarization camera fails to maintain polarization-based orientation tracking in the unknown enclosed environment, the laser radar sensor and the inertial sensor are used together for the navigation, positioning and mapping capabilities of the unmanned platform.

2. The unmanned platform with bionic visual multi-source information and intelligent perception according to claim 1, wherein the bionic polarization vision/inertia/laser radar combined navigation module is used in the outdoor environment for the navigation and orientation precision of the unmanned platform, comprising the following working steps:

(101) using the bionic polarization camera to acquire a sky polarization pattern, and solving to obtain course angle information of the unmanned platform in a horizontal state; and using the inertial sensor to measure a roll angle, a pitch angle and a course angle of the unmanned platform, performing inclination angle compensation for the course angle in the horizontal state to obtain course angle information of the unmanned platform in a non-horizontal state; and (102) fusing the course angle information of the unmanned platform in the horizontal state and the course angle information of the unmanned platform in the non-horizontal state obtained in the step (101) by using a cubature Kalman filter algorithm assisted by a radial basis function neural network, and outputting an optimal course angle information.

3. The unmanned platform with bionic visual multi-source information and intelligent perception according to claim 2, wherein the step (101) has the following specific method:

since the course angle of the carrier in a geographic coordinate system in the horizontal state is $\varphi = \alpha_s - \alpha_b$, wherein $\alpha_b$ and $\alpha_s$ are azimuth angles of the solar meridian in a carrier coordinate system and the geographic coordinate system; under the condition that the local longitude and latitude information of the carrier and accurate time information at the time of observation are known, a solar elevation angle $h_s$ and a solar azimuth angle $\alpha_s$ in the geographic coordinate system are respectively as follows:

$$\sin(h_s) = \sin\delta\sin\beta + \cos\delta\cos\beta\cos t_s$$

$$\cos(\alpha_s) = \frac{\sin(h_s)\sin\beta - \sin\delta}{\cos(h_s)\cos\beta}$$

in the formula, $\delta$, $\beta$ and $t_s$ represent a declination angle of the sun, the latitude of an observation point and an hour angle of the sun respectively;

then, three-channel polarization images are collected through the bionic polarization camera carried by the unmanned platform, feature point sets are searched and identified based on all-sky-domain polarization data by using an E-vector in a direction of the solar meridian is perpendicular to a scattering plane, the feature points are subjected to a linear fitting once to solve $\alpha_b$, and finally the course angle $\varphi$ of the carrier in the geographic coordinate system in the horizontal state can be solved;

when the unmanned platform is in the non-horizontal state, an E-vector direction will not be perpendicular to the solar meridian, but perpendicular to a solar vector, shown in the formula as below:

$$e_p^n \cdot a_{OS}^n = 0$$

in the formula, n represents a navigation coordinate system, b represents the carrier coordinate system, $$a_{OS}^n$$

represents a sun vector in the navigation coordinate system, and $$e_p^n$$

represents the E vector in the navigation coordinate system; the E-vector direction in the carrier coordinate system is defined as

$$e_p^b = [\cos\alpha \ \sin\alpha \ 0]^T,$$

, wherein $\alpha$ represents a clockwise angle between a reference direction of the bionic polarization camera and an E-vector direction of incident light, and

$$C_b^n$$

represents a direction cosine matrix from the carrier coordinate system to the navigation coordinate system, with $$e_p^n = C_b^n e_p^b;$$

30 then in the navigation coordinate system, the sun vector $$a_{OS}^n$$

35 can be calculated by the solar azimuth angle $\alpha_s$ and the solar elevation angle $h_s$, as shown in the following formula:

$$a_{OS}^n = \begin{bmatrix} a_{OSx}^n \\ a_{OSy}^n \\ a_{OSz}^n \end{bmatrix} = \begin{bmatrix} \cos(h_s)\cos(\alpha_s) \\ \cos(h_s)\sin(\alpha_s) \\ \sin(h_s) \end{bmatrix}$$

in the formula, $$a_{OS_x}^n, a_{OS_y}^n, a_{OS_z}^n$$

represent projection of the solar vector in the navigation system;

combined the above formula, the course angle $\Psi$ after inclination angle compensation in the non-horizontal state can be calculated: $\Psi$=arcsin c+arctan d, wherein c and d are intermediate parameters of the solution, and

$$c = \frac{\cos\alpha\sin\theta - \sin\alpha\cos\theta\sin\phi}{c\tanh_s\sqrt{(\sin\alpha\sin\phi\sin\theta + \cos\alpha\cos\theta)^2 + \cos^2\phi\sin^2\alpha}}$$

$$d = \frac{\cos\alpha\cos\theta\cos\alpha_s + \sin\alpha\sin\phi\sin\theta\cos\alpha_s + \cos\phi\sin\alpha\sin\alpha_s}{\cos\alpha\cos\theta\sin\alpha_s + \sin\alpha\sin\phi\sin\theta\sin\alpha_s - \cos\phi\sin\alpha\cos\alpha_s}$$

65 in the formula, $\varphi$ and $\theta$ represent the roll angle and the pitch angle of the carrier in a non-horizontal state, which are obtained by the inertial sensor through solution.

4. The unmanned platform with bionic visual multi-source information and intelligent perception according to claim 2, wherein the step (102) has the following specific method:

first, the inertial sensor realizes initial alignment through the course angle information provided by the bionic polarization camera, a bionic polarization vision/iner-tial combination model is then established, the course angle information output by the inertial system is taken as the quantity of state, the course angle information obtained by the bionic polarization camera through the inclination angle compensation is used as a quantity measurement, and the cubature Kalman filter algorithm is adopted to conduct the data fusion;

a state model in a discrete form is expressed as:

$$x_k = f(x_{k-1}, u_{k-1}) + w_{k-1}$$

$$z_k = h(x_k) + v_k$$

in the formula, $x_k$ and $X_{k-1}$ represent the quantity of state at moments k and k−1 respectively; $u_{k-1}$ is a filter input; $z_k$ is the quantity measurement; f( ) and h( ) are a state transition equation and a measurement equation respectively; and $w_{k-1}$ and $v_k$ are uncorrelated zero-mean Gaussian process noise and measurement noise respectively;

a radial basis function neural network is introduced into a cubature Kalman filter framework to perform error compensation on a filter:

first, a window size h is set, which reflects that the cubature Kalman filter algorithm iteratively estimates the optimal course angle information for h moments within one window size, the quantity of state within a window, and innovations of the cubature Kalman filter and the optimal estimated course angle information are input to the radial basis function neural network for training; when data of the next moment come, the quantity of state, as well as gains and innovations of the cubature Kalman filter at that moment are input to the radial basis function neural network trained in the previous window, and the input and the output are as follows:

$$x_r = [K_r \ I_r \ p_r \ v_r \ q_r \ z_r]^T$$

$$y_r = b_{bias} + \sum We^{-\frac{\|x_r - \mu\|^2}{2\sigma^2}} \quad r = 1, 2, \dots, h$$

in the formula, r represents a certain moment when the $r^{th}$ data within the window come, $K_r$ and $I_r$ represent gains and innovations of the cubature Kalman filter within the window respectively, $p_r$, $v_r$ and $q_r$ represent the quantities of state of positions, velocities and attitudes of the inertial sensor within the window, $z_r$ represents the quantity measurement collected by the bionic polarization camera within the window, $y_r$ represents compensation output of the neural network, $b_{bias}$ represents bias matrix of network nodes, and W represents a weight matrix of the network nodes; and $$e^{-\frac{\|x_r-\mu\|^2}{2\sigma^2}}$$

represents a Gaussian kernel, wherein $\mu$ and $\sigma$ represent a center and a width of the Gaussian kernel function respectively, and wherein $\|xr-\mu\|$ represents an Euclidean distance between a state quantity $xr$ and a center $\mu$ of a Gaussian kernel function; and estimated values of the cubature Kalman filter algorithm at the current moment are then compensated and corrected through error values output by the radial basis function neural network, data of the next window size h, starting from the current correction moment, are used to continue training the radial basis function neural network, when data of the next moment after the end of a second window come, the estimated values of the cubature Kalman filter algorithm are compensated and corrected again through error values output by the retrained radial basis function neural network, and iteration is performed in such a way, so that the cubature Kalman filter can be optimized by the radial basis function neural network.

5. The unmanned platform with bionic visual multisource information and intelligent perception according to claim 1, wherein the bionic polarization vision/inertia/laser radar combined navigation module is used in the unknown enclosed environment to perform navigation, positioning, and mapping of the unmanned platform, comprising the following working steps:

(201) pre-integrating the inertial sensor, and performing discretization to obtain a relationship among positions, velocities and attitudes at two quantity measurement values of the inertial sensor by using a median method;

(202) designing a residual term through the pre-integration of the inertia sensor in the step (201) and calculating a Jacobian of the residual term relative to variables to be optimized to obtain pre-integration relative constraints, fusing the pre-integration relative constraints with relative pose constraints of the laser radar, constructing a nonlinear optimization model, constructing a laser/inertia odometry, and solving the optimal pose; and (203) mapping the unknown enclosed environment according to landmark points obtained by the laser/inertia odometry in the step (202).

6. The unmanned platform with bionic visual multisource information and intelligent perception according to claim 5, wherein the step (201) has the following specific method:

in the step (201), performing navigation according to the measurement information of the inertial sensor and the laser radar when the unmanned platform enters the unknown enclosed environment and the bionic polarization camera suffers a failure; first, pre-integration is carried out on the inertial sensor, and a continuous expression of a pre-integration method is as follows:

$$p_{b_{k+1}}^w = p_{b_k}^w + v_{b_k}^w \Delta t + \int\int_{t\in[k,k+1]} (q_{b_t}^w a_{b_t} - b_{a_t} - n_a - g^w)dt^2$$

$$v_{b_{k+1}}^w = v_{b_k}^w + \int_{t\in[k,k+1]} (q_{b_t}^w a_{b_t} - b_{a_t} - n_a - g^w)dt$$

$$q_{b_{k+1}}^w = q_{b_k}^w \otimes \int_{t\in[k,k+1]} \frac{1}{2} q_{b_t}^{b_k} \otimes (\omega_{b_t} - b_{\omega_t} - n_\omega)dt$$

in the formula, subscript b represents the carrier coordinate system, w is a world coordinate system, a time interval between two frames is $\Delta t$, $$p_{b_{k+1}}^w, p_{b_k}^w$$

represent positions at moments k+1 and k in the world coordinate system respectively, $$v_{b_{k+1}}^w, v_{b_k}^w$$

represent velocities at the moments k+1 and k in the world coordinate system respectively, $$q_{b_{k+1}}^w, q_{b_k}^w$$

represent attitudes at the moments k+1 and k in the world coordinate system respectively, $a_{b_t}$ and $\omega_{b_t}$ represent outputs of an accelerometer and a gyroscope at a moment t, $b_{a_t}$, $b_{\omega_t}$ represent zero bias of the accelerometer and the gyroscope at the moment t, $n_a$ and $n_\omega$ represent random noise of the accelerometer and the gyroscope, and $g^w$ represents a gravity acceleration in the world coordinate system, the median method is adopted to perform discretization, and the relationship of outputs between the $i+1^{th}$ and the $i^{th}$ inertial sensors is as follows:

$$p_{b_{i+1}}^w = p_{b_i}^w + v_{b_i}^w \delta t + \frac{1}{2}\bar{a}\delta t^2$$

$$v_{b_{i+1}}^w = v_{b_i}^w + \bar{a}\delta t$$

$$q_{b_{i+1}}^w = q_{b_i}^w \otimes \begin{bmatrix} 1 \\ \frac{1}{2}\bar{\omega}\delta t \end{bmatrix}$$

in the formula, $$p_{b_{i+1}}^w, p_{b_i}^w$$

represent positions at an output moment of the $i+1^{th}$ and the $i^{th}$ inertial sensors after discretization in the world coordinate system respectively, $$v_{b_{i+1}}^w, v_{b_i}^w$$

represent velocities at the output moment of the i+1$^{th}$ and the i$^{th}$ inertial sensors after discretization in the world coordinate system respectively, $$q_{b_{i+1}}^w, q_{b_i}^w$$

represent attitudes at the output moment of the i+1$^{th}$ and the i$^{th}$ inertial sensors after discretization in the world coordinate system respectively, and δt represents an time interval of outputs between the i+1$^{th}$ and the i$^{th}$ inertial sensors; and acceleration $\bar{a}$ and angular velocity $\bar{\omega}$ are the average value of two quantity measurements, that is:

$$\bar{a} = \frac{1}{2}\left[q_{b_i}^w(a_{b_i} - b_{a_i} - n_a) - g^w + q_{b_{i+1}}^w(a_{b_{i+1}} - b_{a_{i+1}} - n_a) - g^w\right]$$

$$\bar{\omega} = \frac{1}{2}\left[(\omega_{b_i} - b_{\omega_i} - n_\omega) + (\omega_{b_{i+1}} - b_{\omega_{i+1}} - n_\omega)\right]$$

formula, $a_{b_i}$, $a_{b_{i+1}}$ represent outputs of the accelerometer at the output moment of the i+1$^{th}$ and the i$^{th}$ inertial sensors respectively, $\omega_{b_i}$, $\omega_{a_{i+1}}$ represent outputs of the gyroscope at the output moment of the i+1$^{th}$ and the i$^{th}$ inertial sensors respectively, $b_{a_i}$, $b_{a_{i+1}}$ represent zero bias of the accelerometer at the output moment of the i+1$^{th}$ and the i$^{th}$ inertial sensors respectively, and $b_{\omega_i}$, $b_{\omega_{i+1}}$ represent zero bias of the gyroscope at the output moment of the i+1$^{th}$ and the i$^{th}$ inertial sensors respectively.

7. The unmanned platform with bionic visual multi-source information and intelligent perception according to claim 5, wherein the step (202) has the following specific method:

in the step (202), defining the quantity of state to be optimized and estimated of the system within a sliding window as:

$$X = \left[x_1^{imu}, \ldots, x_k^{imu}, \ldots, x_s^{imu}, x_1^{lidar}, \ldots, x_k^{lidar}, \ldots, x_s^{lidar}\right]^T$$

$$x_k^{imu} = \left[p_{b_k}^w, v_{b_k}^w, q_{b_k}^w, b_{a_k}, b_{\omega_k}\right]^T$$

$$x_k^{lidar} = \left[p_{i_k}^w, q_{i_k}^w\right]^T, k \in [0, s]$$

in the formula, the sliding window is provided with the quantities of state pre-integrated by the inertial sensor at s moments and the quantities of state obtained by the laser radar at s moments, the laser radar has a frequency of 10 Hz, the inertial sensor has a frequency of 200 Hz, and pre-integration is carried out between every two frames of the laser radar through the inertial sensor;

$$x_1^{imu}, x_k^{imu}, x_s^{imu}$$

represent pre-integrated states of the inertial sensor at an initial moment (a first moment), a moment k and a moment s respectively; and $$x_1^{lidar}, x_k^{lidar}, x_s^{lidar}$$

represent the quantities of state of the laser radar at the initial moment, the moment k and the moment s respectively; and $b_{a_k}$, $b_{\omega_k}$ are zero bias of the accelerometer and the gyroscope at the moment k, and $$p_{i_k}^w, q_{i_k}^w$$

are a position and an attitude estimated by the laser radar at the moment k;

after state variables are defined, the residual term of the inertia sensor and the laser radar is designed, the Jacobian of the residual term relative to variables to be optimized is calculated, and a nonlinear optimization function of the laser radar/inertial combined navigation is then constructed:

$$\min_X\left\{\sum_{k=0}^{s}\left[r_B^k(z_{k-1}^k, x_k^{imu})\right]^2 + \sum_{k=0}^{s}\left[r_L^k(m_k, x_k^{lidar})\right]^2\right\}$$

in the formula, $\lceil\ \rceil$ represents a Mahalanobis Distance of the vector, $$r_B^k(\ )$$

represents a measurement residual of the inertial sensor, $$r_L^k(\ )$$

represents a point cloud measurement residual of the laser radar, $$z_k^{k+1}$$

represents relative measurement variation of the inertial sensor between the moments k and k−1, and $m_k$ represents measurement information of the laser radar at the moment k;

finally, a Gauss-Newton method is adopted to solve the nonlinear optimization function, so as to obtain the optimal pose estimation.

8. The unmanned platform with bionic visual multi-source information and intelligent perception according to claim 1, wherein the deep learning object detection module has the following specific method:

first, the monocular vision camera sensor is used to collect RGB images of a surrounding environment, with the collection frequency of 30 Hz; a bilinear interpolation algorithm is then adopted to adjust grayscale images to be a size of 640×640, and a median filtering algorithm is adopted to denoise the images and complete pre-processing of the images; and a multi-directional blur superposition algorithm is adopted to simulate a blurred image problem caused by a vision camera in a real environment, as shown in the following formula:

$$P_{stack}^R = \sum_{j}^{m} T_j \left( P_j^R \cdot \gamma_j \right)$$

$$P_{stack}^G = \sum_{j}^{m} T_j \left( P_j^G \cdot \gamma_j \right) \quad j = 1, 2, 3, \ldots, m$$

$$P_{stack}^B = \sum_{j}^{m} T_j \left( P_j^B \cdot \gamma_j \right)$$

in the formula, $$P_{stack}^R, P_{stack}^G, P_{stack}^B$$

represent pixel values of corresponding coordinates on the images after superposition on three RGB channels respectively, $$P_j^R, P_j^G, P_j^B$$

represent pixel values of the original coordinates on the three RGB channel respectively, $\gamma_j$ represents a transparency factor of the superposed images, and $T_j$ represents a blurring superposition displacement matrix, which is determined by a superposition direction, a step length and the number of superposed images; and an image data set simulated by the multi-directional blur superposition algorithm is input to a YOLOv7 deep learning network for training, finally enhanced images are input to the trained YOLOv7 deep learning network to obtain object detection frames and vertex coordinates of various objects in the images.

\* \* \* \* \*